United States Patent
Shanahan et al.

(10) Patent No.: US 6,721,852 B2
(45) Date of Patent: Apr. 13, 2004

(54) COMPUTER SYSTEM EMPLOYING MULTIPLE BOARD SETS AND COHERENCE SCHEMES

(75) Inventors: Patricia Shanahan, San Diego, CA (US); Andrew E. Phelps, Encinitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 186 days.

(21) Appl. No.: 09/981,532

(22) Filed: Oct. 17, 2001

(65) Prior Publication Data

US 2003/0079086 A1 Apr. 24, 2003

(51) Int. Cl.$^7$ ................................ G06F 12/00
(52) U.S. Cl. .............. 711/133; 711/136; 711/159; 711/160
(58) Field of Search .................. 711/133, 136, 711/159, 160

(56) References Cited

U.S. PATENT DOCUMENTS

| | | | |
|---|---|---|---|
| 5,664,121 A | * | 9/1997 | Cerauskis .................. 710/113 |
| 5,829,033 A | * | 10/1998 | Hagersten et al. .......... 711/141 |
| 5,911,052 A | * | 6/1999 | Singhal et al. .............. 710/113 |
| 6,243,742 B1 | | 6/2001 | Hagersten et al. .......... 709/213 |
| 6,243,794 B1 | * | 6/2001 | Casamatta ................... 711/153 |
| 6,490,654 B2 | * | 12/2002 | Wickeraad et al. ......... 711/133 |
| 6,532,520 B1 | * | 3/2003 | Dean et al. ................. 711/133 |
| 6,542,966 B1 | * | 4/2003 | Crawford et al. ........... 711/133 |
| 2002/0049889 A1 | * | 4/2002 | Hoogerbrugge et al. .... 711/134 |

* cited by examiner

*Primary Examiner*—Reba I. Elmore
(74) *Attorney, Agent, or Firm*—Meyertons Hood Kivlin Kowert & Goetzel, P.C.; B. Noël Kivlin (57) ABSTRACT

The present invention provides a method and apparatus for updating a directory cache. The method comprises detecting a memory access transaction, determining a retention value based on the type of memory access transaction, and storing the retention value in an entry associated with the memory access transaction.

15 Claims, 11 Drawing Sheets

COMPUTER SYSTEM EMPLOYING MULTIPLE BOARD SETS AND COHERENCE SCHEMES

BACKGROUND OF THE INVENTION

1. Field of the Invention

This invention relates generally to processor-based systems, and, more particularly, to updating a directory cache in a distributed, shared-memory processor-based system.

2. Description of the Related Art

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

One example of a processor-based system used in a network-centric environment is a mid-range server system. A single mid-range server system may have a plurality of system boards that may, for example, be configured as one or more domains, where a domain, for example, may act as a separate machine by running its own instance of an operating system to perform one or more of the configured tasks.

A mid-range server, in one embodiment, may employ a distributed shared memory system, where processors from one system board can access memory contents from another system board. The union of all of the memories on the system boards of the mid-range server comprises a distributed shared memory (DSM).

One method of accessing data from other system boards within a system is to broadcast a memory request on a common bus. For example, if a requesting system board desires to access information stored in a memory line residing in a memory of another system board, the requesting system board typically broadcasts on the common bus its memory access request. All of the system boards in the system may receive the same request, and the system board whose memory address ranges match the memory address provided in the memory access request may then respond.

The broadcast approach for accessing contents of memories in other system boards may work adequately when a relatively small number of system boards are present in a system. However, such an approach may be unsuitable as the number of system boards grows. As the number of system boards grows, so does the number of memory access requests, thus to handle this increased traffic, larger and faster buses may be needed to allow the memory accesses to complete in a timely manner. Operating a large bus at high speeds may be problematic because of electrical concerns, in part, due to high capacitance, inductance, and the like. Furthermore, a larger number of boards within a system may require extra broadcasts, which could further add undesirable delays and may require additional processing power to handle the extra broadcasts.

Designers have proposed the use of directory caches in a distributed shared memory systems to reduce the need for globally broadcasting memory requests. Typically, each system board serves as home board for memory lines within a selected memory address range, and where each system board is aware of the memory address ranges belonging to the other system boards within the system. Each home board generally maintains its own directory cache for memory lines that fall within its address range. Thus, when a requesting board desires to access memory contents from another board, instead of generally broadcasting the memory request in the system, the request is transmitted to the appropriate home board. The home board may consult its directory cache and determine which system board is capable of responding to the memory request.

Directory caches are generally effective in reducing the need for globally broadcasting memory requests during memory accesses. However, implementing a directory cache that is capable of mapping every memory location within a system board generally represents a significant memory overhead. As such, directory caches are often designed to hold only a subset of the total memory. When a particular directory cache is full, old entries may be discarded or overwritten to make room for the new ones. However, updating a directory cache to replace old entries with new ones may prove computationally expensive, particularly when it is desirable to have access to the replaced entries in the near future.

SUMMARY OF THE INVENTION

In one aspect of the instant invention, an apparatus is provided for updating a directory cache. The apparatus comprises a control unit adapted to detect a memory access transaction, determine a retention value based on the type of memory access transaction, and store the retention value in an entry associated with the memory access transaction.

In another aspect of the present invention, a method is provided for updating a directory cache. The method comprises detecting a memory access transaction, determining a retention value based on the type of memory access transaction, and storing the retention value associated with the memory access transaction in the directory cache.

In yet another aspect of the instant invention, an article comprising one or more machine-readable storage media containing instructions is provided for updating a directory cache. The instructions, when executed, may enable a processor to perform coherence for memory transactions within a first system board set using a first coherence scheme. The instructions, when executed, may further enable the processor to perform coherence for memory transactions between the first system board set and a second system board set using a second coherence scheme, wherein the second coherence scheme employs a retention value associated with one or more entries stored in the directory cache to identify which entry to victimize when storing a new entry.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As will be described in more detail below, in accordance with one or more embodiments of the present invention, a directory cache is updated to reduce the number of cache misses. As such, the overall performance efficiency of a processor-based system may be improved.

Figure 1:
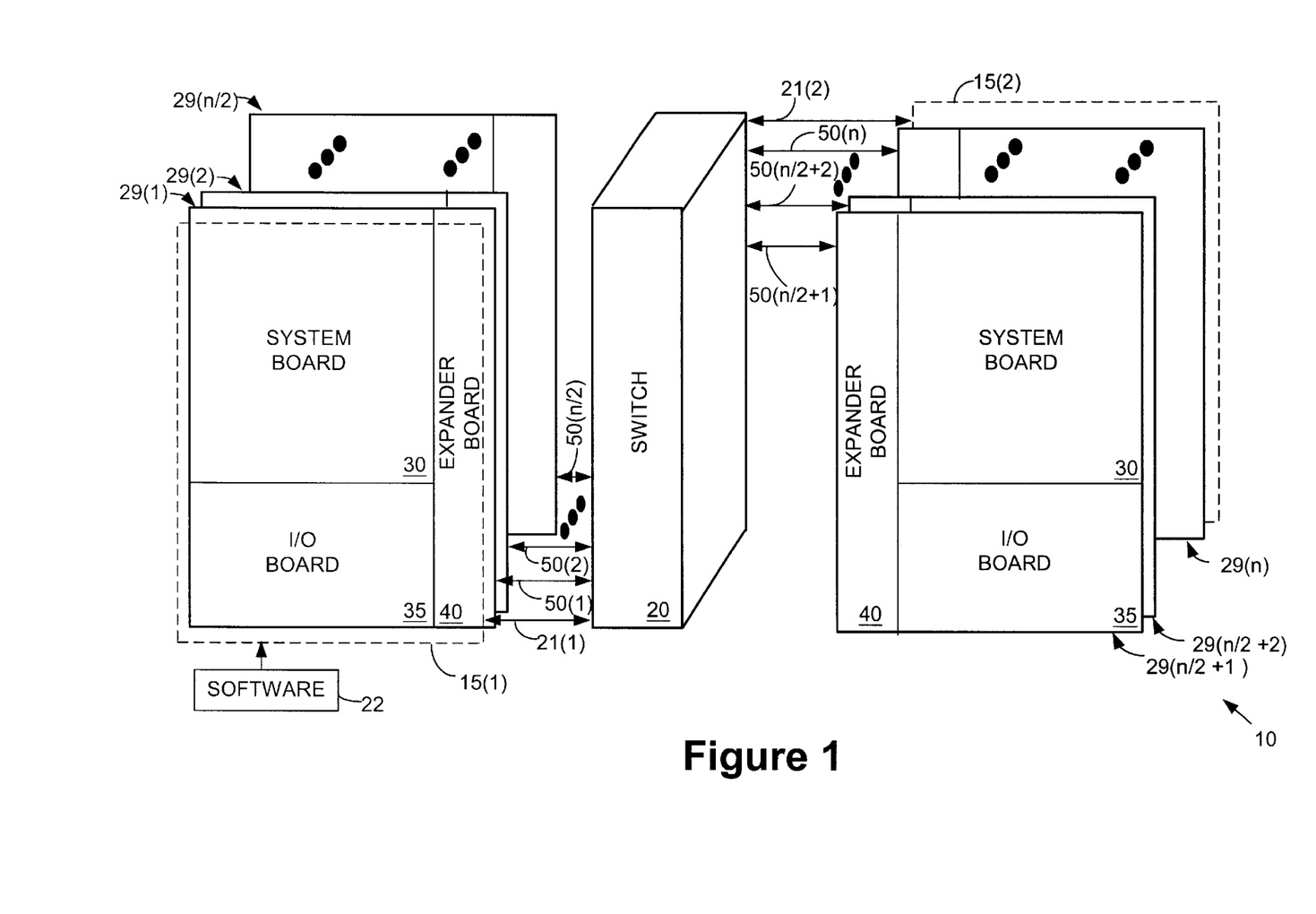
FIG. 1 shows a stylized block diagram of a system in accordance with one embodiment of the present invention.

Referring now to FIG. 1, a block diagram of a system 10 in accordance with one embodiment of the present invention is illustrated. The system 10, in one embodiment, includes a plurality of system control boards 15(1–2) that are coupled to a switch 20. For illustrative purposes, lines 21(1–2) are utilized to show that the system control boards 15(1–2) are coupled to the switch 20, although it should be appreciated that, in other embodiments, the boards 15(1–2) may be coupled to the switch in any of a variety of ways, including by edge connectors, cables, or other available interfaces.

In the illustrated embodiment, the system 10 includes two control boards 15(1–2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate hot-swap replaceable system control board. In one embodiment, during any given moment, generally one of the two system control boards 15(1–2) actively controls the overall operations of the system 10.

If failures of the hardware or software occur on the main system control board 15(1) or failures on any hardware control path from the main system control board 15(1) to other system devices occur, the system controller failover software 22 automatically triggers a failover to the alternative control board 15(2). The alternative system control board 15(2), in one embodiment, assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1–2).

The system 10, in one embodiment, includes a plurality of system board sets 29(1-n) that are coupled to the switch 20, as indicated by lines 50(1-n). The system board sets 29(1-n) may be coupled to the switch 20 in one of several ways, including edge connectors or other available interfaces. The switch 20 may serve as a communications conduit for the plurality of system board sets 29(1-n), half of which may be connected on one side of the switch 20 and the other half on the opposite side of the switch 20.

The switch 20, in one embodiment, may be a 18×18 crossbar switch that allows system board sets 29(1-n) and system control boards 15(1–2) to communicate, if desired. Thus, the switch 20 may allow the two system control boards 15(1–2) to communicate with each other or with other system board sets 29(1-n), as well as allow the system board sets 29(1-n) to communicate with each other.

The system board sets 29(1-n), in one embodiment, comprise one or more boards, including a system board 30, I/O board 35, and expander board 40. The system board 30 may include processors and associated memories for executing, in one embodiment, applications, including portions of an operating system. The I/O board 35 may manage I/O cards, such as peripheral component interface cards and optical cards that are installed in the system 10. The expander board 40, in one embodiment, generally acts as a multiplexer (e.g., 2:1 multiplexer) to allow both the system and I/O boards 30, 35 to interface with the switch 20, which, in some instances, may have only one slot for interfacing with both boards 30, 35.

In one embodiment, the system 10 may be dynamically subdivided into a plurality of system domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system) and may be reconfigured without interrupting the operation of other domains.

Figure 2:
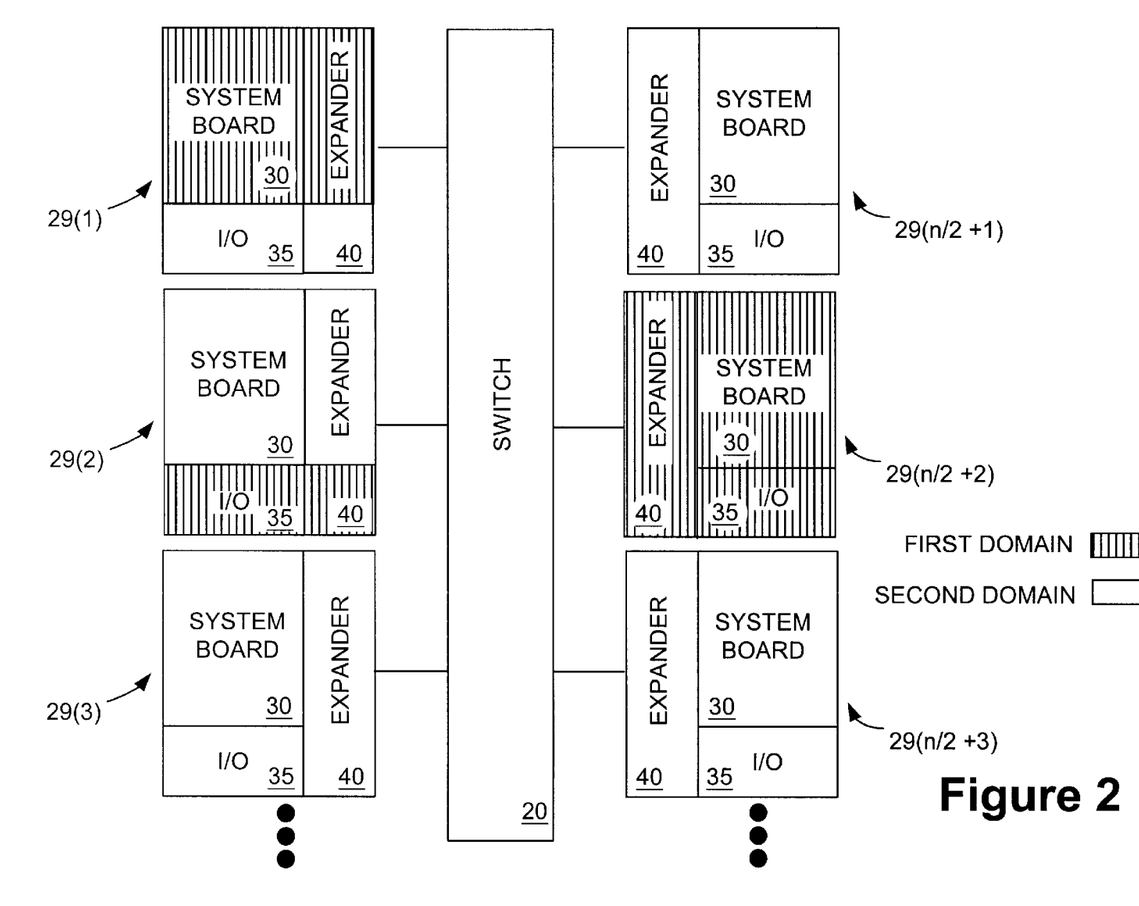
FIG. 2 illustrates a block diagram of an exemplary domain configuration that may be employed in the system of FIG. 1, in accordance with one embodiment of the present invention.

FIG. 2 illustrates an exemplary arrangement where at least two domains are defined in the system 10. The first domain, identified by vertical cross-sectional lines, includes the system board set 29(n/2+2), the system board 30 of the system board set 29(1), and the I/O board 35 of the system board set 29(2). The second domain in the illustrated embodiment includes the system board sets 29(3), 29(n/2+1), and 29(n/2+3), as well as the I/O board 35 of the system board set 29(1) and the system board 30 of the system board set 29(2).

As shown, a domain may be formed of an entire system board set 29(1-n), one or more boards (e.g., system board 30, I/O board 35) from selected system board sets 29(1-n), or a combination thereof. Although not necessary, it may be possible to define each system board set 29(1-n) as a separate domain. For example, if each system board set 29(1-n) were its own domain, the system 10 may conceivably have up to "n" (i.e., the number of system board sets)

different domains. When two boards (e.g., system board 30, I/O board 35) from the same system board set 29(1-n) are in different domains, such a configuration is referred to as a "split expander." The expander board 40 of the system board sets 29(1-n), in one embodiment, keeps the transactions separate for each domain. No physical proximity may be needed for boards in a domain.

Using the switch 20, inter-domain communications may be possible. For example, the switch 20 may provide a high-speed communications path so that data may be exchanged between the first domain and the second domain of FIG. 2. In one embodiment, a separate path for data and address through the switch 20 may be used for inter-domain communications.

Figure 3:
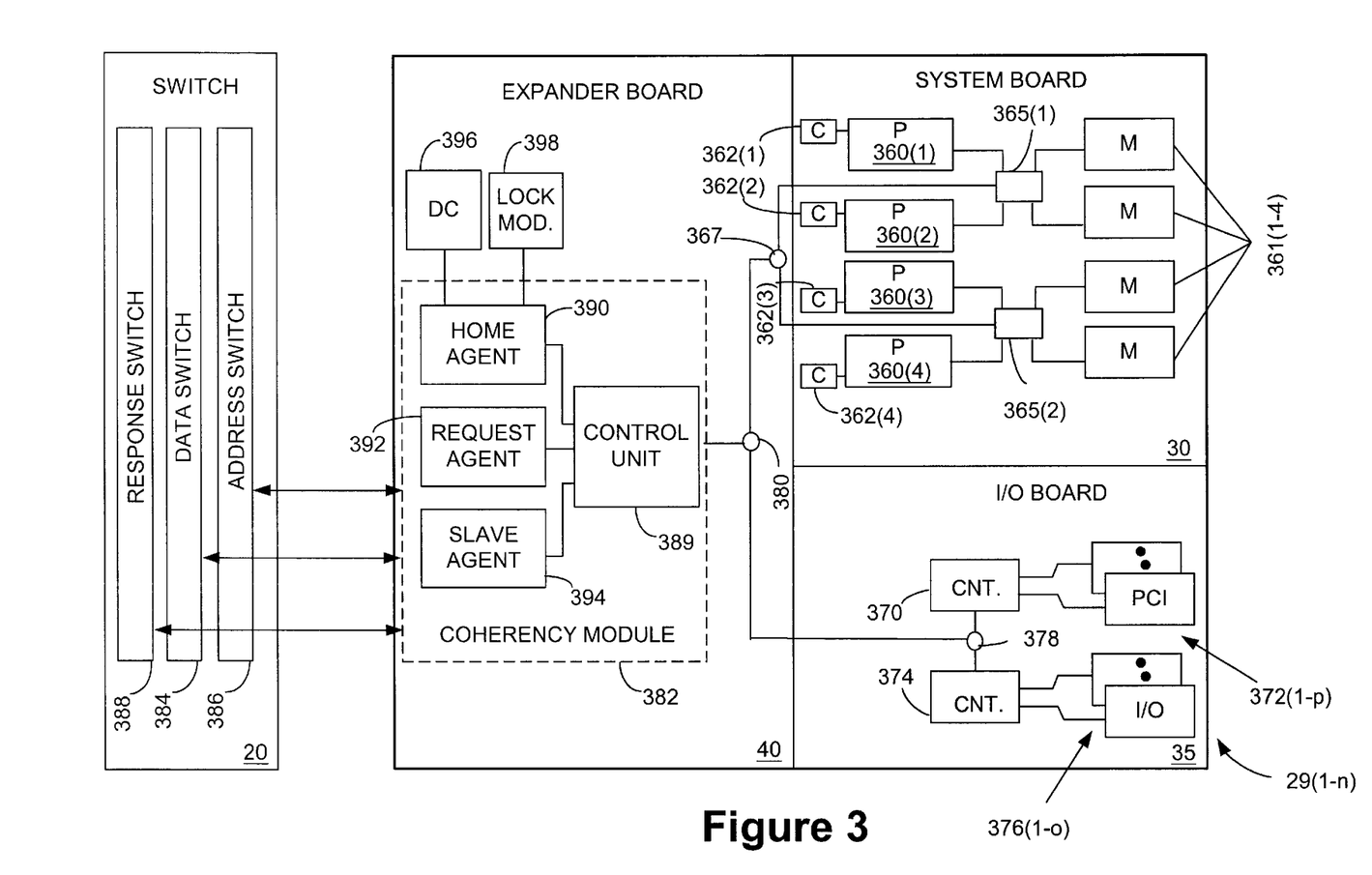
FIG. 3 depicts a stylized block diagram of one system board set that may be employed in the system of FIG. 1, in accordance with one embodiment of the present invention.

Referring now to FIG. 3, a block diagram of the system board set 29(1-n) coupled to the switch 20 is illustrated, in accordance with one embodiment of the present invention. The system board 30 of each system board set 29(1-n) in the illustrated embodiment includes four processors 360(1–4), with each of the processors 360(1–4) having an associated memory 361(1–4). In one embodiment, each of the processors 360(1–4) may be coupled to a respective cache memory 362(1–4). In other embodiments, each of the processors 360(1–4) may have more than one associated cache memories, wherein some or all of the one or more cache memories may reside within the processors 360(1–4). In one embodiment, each cache memory 362(1–4) may be a split cache, where a storage portion of the cache memory 362(1–4) may be external to the processor, and a control portion (e.g., tags and flags) may be resident inside the processors 360(1–4).

The processors 360(1–4), in one embodiment, may be able to access their own respective memories 360(1–4) and 362(1–4), as well as access the memories associated with other processors. In one embodiment, a different number of processors and memories may be employed in any desirable combination, depending on the implementation. In one embodiment, two five-port dual data switches 365(1–2) connect the processor/memory pairs (e.g., processors 360(1–2)/memories 361(1–2) and processors 360(3–4)/memories 361(3–4)) to a board data switch 367.

Although not so limited, the I/O board 35 of each system board set 29(1-n) in the illustrated embodiment includes a controller 370 for managing one or more of the PCI cards that may be installed in one or more PCI slots 372(1-p). In the illustrated embodiment, the I/O board 35 also includes a second controller 374 for managing one or more I/O cards that may be installed in one or more I/O slots 376(1-o). The I/O slots 376(1-o) may receive optics cards, network cards, and the like. The I/O board 35, in one embodiment, may communicate with the system control board 15(1–2) (see FIG. 1) over an internal network (not shown).

The two controllers 370, 374 of the I/O board 35, in one embodiment, are coupled to a data switch 378. A switch 380 in the expander board 40 receives the output signal from the switch 378 of the I/O board 35 and from the switch 367 of the system board set 29(1-n) and provides it to a coherency module 382, in one embodiment. Although only a data path (e.g., via the switch 380) is shown in the illustrated embodiment, each system board set 29(1-n), in one embodiment, may include a separate data path, address path, and control (or "response") path from the system boards and I/O boards 30, 35 to the coherency module 382 of the expander board 40.

In one embodiment, the switch 20 may include a data switch 384, address switch 386, and response switch 388 for transmitting respective data, address, and control signals provided by the coherency module 382 of each expander board 40 of the system board sets 29(1-n). Thus, in one embodiment, the switch 20 may include three 18×18 crossbar switches that provide a separate data path, address path, and control signal path to allow intra- and inter-domain communications. Using separate paths for data, addresses, and control signals, may reduce the interference among data traffic, address traffic, and control signal traffic. In one embodiment, the switch 20 may provide a bandwidth of about 43 Gigabytes per second. In other embodiments, a higher or lower bandwidth may be achieved using the switch 20.

It should be noted that the arrangement and/or location of various components (e.g., coherency module 382, processors 360(1–4), controllers 370, 374) within each system board set 29(1–4) is matter of design choice, and thus may vary from one implementation to another. Additionally, more or fewer components may be employed without deviating from the scope of the present invention.

In accordance with one embodiment of the present invention, cache coherency is performed at two different levels, one at the intra-system board set 29(1-n) level and one at the inter-system board set 29(1-n) level. With respect to the first level, cache coherency within each system board set 29(1-n) is performed, in one embodiment, using conventional cache coherency snooping techniques, such as the modified, exclusive, shared, and invalid (MESI) cache coherency protocol. As such, the processors 360(1-n) may broadcast transactions to other devices within the system board set 29(1-n), where the appropriate device(s) may then respond with the desired results or data.

Because the number of devices within the system board set 29(1-n) may be relatively small, a conventional coherency snooping technique, in which requests are commonly broadcasted to other devices, may adequately achieve the desired objective. However, because the system 10 may contain a large number of system board sets 29(1-n), each having one or more processors, memory accesses may require a large number of broadcasts before such requests can be serviced. Accordingly, a second level of coherency may be performed at the system level (between the expander boards 40) by the coherency module 382 of each expander board 40 using, in one embodiment, the scalable shared memory (SSM) protocol.

The coherency module 382, in one embodiment, includes a control unit 389 coupled to a home agent 390, a request agent 392, and a slave agent 394. Collectively, the agents 390, 392, 394 may operate to aid in maintaining system-wide coherency. In the illustrated embodiment, the control unit 389 of the coherency module 382 interconnects the system board 30 and the I/O board 40 as well as interconnects the home agent 390, request agent 392, slave agent 394 within the coherency module 382. In one embodiment, if the expander, if the expander board 40 is split between two domains (i.e., the system and the I/O boards 30 and 35 of one system board set 29(1-n) are in different domains), the control unit 389 of the coherency module 382 may arbitrate the system board 30 and I/O board 35 separately, one on odd cycles, and the other on even cycles.

The SSM protocol uses MTags embedded in the data to control what the devices under the control of each expander board 40 can do to a cache line. The MTags may be stored in the caches 362(1–4) of each system board set 29(1-n). Table 1 below illustrates three types of values that may be associated with MTags.

TABLE 1

| MTag Type | Description |
| --- | --- |
| Invalid (gI) | No read or write allowed for this type of line. A device must ask for a new value before completing an operation with this line. |
| Shared (gS) | A read may complete, but not a write. |
| Modifiable (gM) | Both reads and writes are permitted to this line. |

As mentioned, the Mtag states are employed in the illustrated embodiment in addition to the conventional MESI cache coherency protocol. For example, to do a write, a device should have a copy of the line that is both M and gM. If the line is gM but not M, then the status of the line may be promoted to M with a transaction within the expander board 40; if the line is not gM, then a remote transaction may have to be done involving the cache coherency module 382, which, as mentioned, employs the SSM protocol in one embodiment.

The coherency module 382, in one embodiment, controls a directory cache (DC) 396 that holds information about lines of memory that have been recently referenced using the SSM protocol. The DC 396, in one embodiment, may be stored in a volatile memory, such as a static random access memory (SRAM). The DC 396 may be a partial directory in that it may not have enough entry slots to hold all of the cacheable lines that are associated with a given expander board 40. As is described in more detail later, the coherency module 382, in one embodiment, controls a locking module 398 that prevents access to a selected entry in the directory cache 396 when the status of that entry, for example, is being updated.

Figures 4A, 4B:
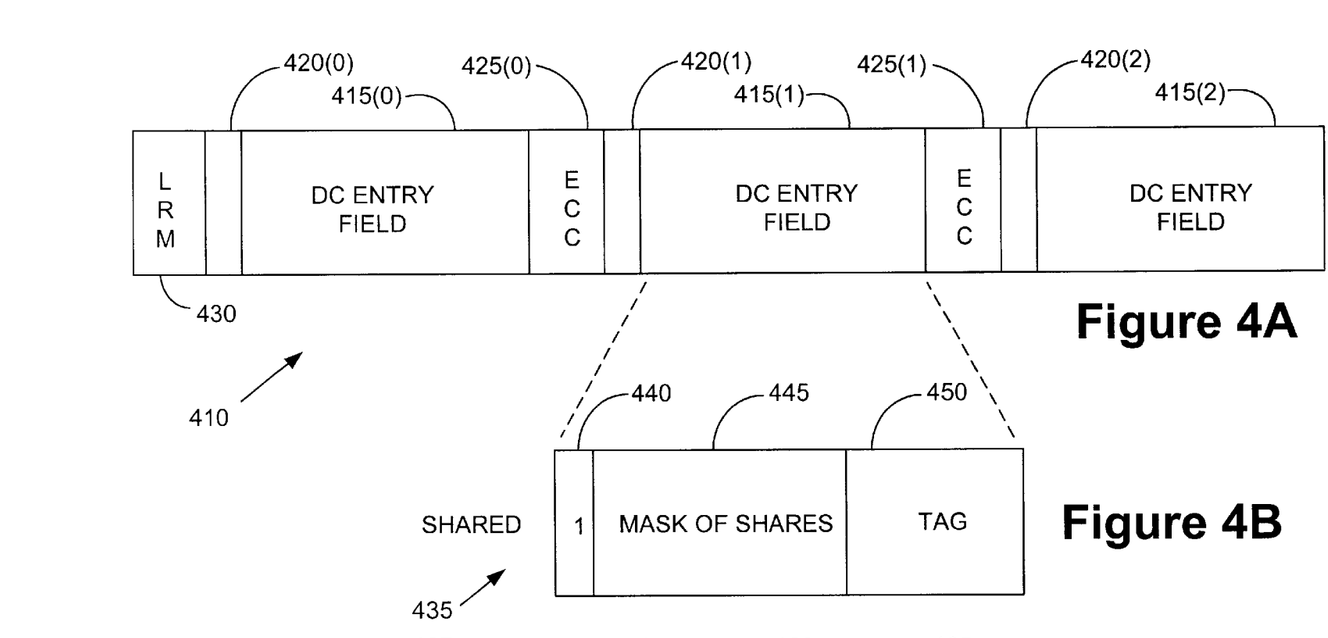
FIGS. 4A–C illustrate an exemplary directory cache entry that may be employed in the system of FIG. 1, in accordance with one embodiment of the present invention.

The DC 396 may be capable of caching a predefined number of directory entries corresponding to cache lines of the caches 367(1–4) for a given system board 30. The DC 396 may be chosen to be of a suitable size so that a reasonable number of commonly used memory blocks may generally be cached. Although not so limited, in the illustrated embodiment, the DC 396 is a 3-way set-associative cache, formed of three SRAMs that can be read in parallel. An exemplary 3-wide DC entry 410 is shown in FIG. 4A. The DC 396, in one embodiment, includes a plurality of the 3-wide DC entries (collectively referred to as a "set") 410. Each DC entry in a given set 410 may be indexed by a hash of the address.

As shown in FIG. 4A, in one embodiment, each of the three DC entry fields 415(0–2) has an associated address parity field 420(0–2) and an error correction code (ECC) field 425(0–1). In case of errors, the ECC field 425(0–1) may allow error correction, in some instances. Each 3-wide DC entry 410 includes a least recently modified (LRM) field 430 that may identify which of the three DC entry fields 415(0–2) was least recently modified. Although other encoding techniques may be employed, in the illustrated embodiment, three bits are used to identify the LRM entry. An exemplary list of LRM codes employed in the illustrated embodiment is provided in Table 2 below.

TABLE 2

DC Least-Recently-Modified encoding

| LRM | Most Recent | Middle | Least Recent |
| --- | --- | --- | --- |
| 000 | Entry 0 | Entry 1 | Entry 2 |
| 001 | Entry 1 | Entry 0 | Entry 2 |
| 010 | Entry 2 | Entry 0 | Entry 1 |
| 011 | *undefined state* | | |
| 100 | Entry 0 | Entry 2 | Entry 1 |
| 101 | Entry 1 | Entry 2 | Entry 0 |
| 110 | Entry 2 | Entry 1 | Entry 0 |
| 111 | *undefined state* | | |

As indicated in the exemplary encoding LRM scheme of Table 2, various combinations of bits in the LRM field 430 identifies the order in which the three entry fields 415(0–2) in the DC 396 were modified. As an example, the digits '000' (i.e., the first entry in Table 2), indicate that the entry field 415(2) was least recently modified, followed by the middle entry field 415(1), and then the first entry field 415(0), which was most recently modified. As an added example, the digits '101' indicate that the entry field 415(0) was least recently modified, followed by the entry field 415(2), and then the entry field 415(1), which was most recently modified. As described later, the LRM field 430, in one embodiment, is utilized in part to determine which DC entry field 415(0–2) to victimize from a particular set 410 of the DC 396 when that set 410 is full.

Figure 4C:
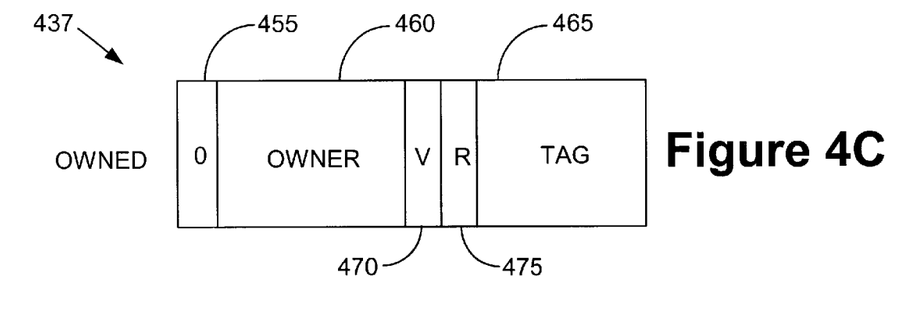

In accordance with one embodiment of the present invention, two different types of entries, a shared entry 435 and an owned entry 437, may be stored in the entry fields 415(0–2) of the DC 396, as shown in FIGS. 4B–C. An owned entry 437, in one embodiment, signifies that a particular expander board 40 has both read and write access for that particular entry. A shared entry 435, in one embodiment, indicates that one or more expander boards 40 have read, but not write, access for that particular entry.

The shared entry 435, in one embodiment, includes an identifier field 440, a mask field 445, and an address tag field 450. The identifier field 440, in the illustrated embodiment, is a single bit field 440, which, if equal to bit 1, indicates that the stored cache line is shared by one or more of the processors 360(1–4) of the system board sets 29(1-n) in the system 10. The mask field 445, which may have up to "n" bits (i.e., one bit for each of the system board sets 29(1-n)), identifies through a series of bits which of the system boards 30 of the system board sets 29(1-n), has a shared copy of the cache line. The address tag field 450 may store at least a portion of the address field of the corresponding cache line, in one embodiment.

The owned entry 437 includes an identifier field 455, an owner field 460, an address tag field 465, a valid field 470, and retention bit field 475, in one embodiment. The identifier field 455, in the illustrated embodiment, is a single bit field 440, which, if equal to bit 0, indicates that the stored cache line is owned by one of the processors 360(1–4) of the system board sets 29(1-n) in the system 10. The owner field 460 is adapted to store the identity of a particular expander board 40 of the system board sets 29(1-n) that holds the valid copy of the cache line. The address tag field 465 may be adapted to store at least an identifying portion of the address field of the corresponding cache line, in one embodiment. For example, the tag field 465 may be comprised of the upper order bits of the address. The valid field 470, in one embodiment, indicates if the corresponding entry in the DC 396 is valid. An entry in the DC 396 may be invalid at start-up, for example, when the system 10 or domain in the system 10 is first initialized. As described in more detail below, the retention bit field 475, in one embodiment, is adapted to indicate the desirability of retaining the corresponding entry in the DC 396 when deciding which entry to replace in a particular set 410 (see FIG. 4A) when that set 410 in the DC 396 is full. In an alternative embodiment, if the DC 396 is a full-associative directory cache, then the victimization may occur on a directory cache level (i.e., as opposed to a set level).

Figure 5:
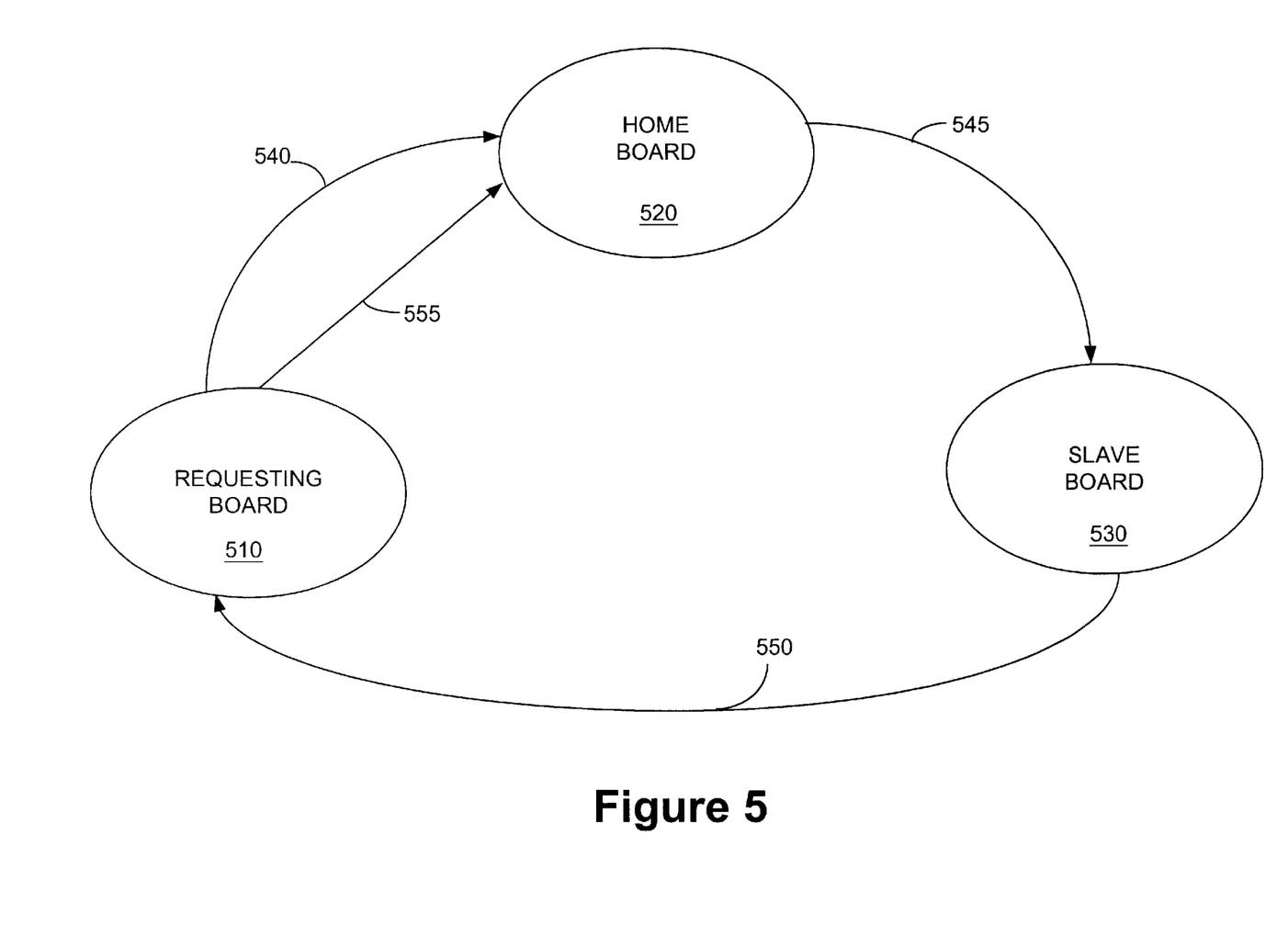
FIG. 5 illustrates a state diagram including the various communication paths between one or more boards of the system of FIG. 1, in accordance with one embodiment of the present invention.

Referring now to FIG. 5, a state diagram including the various communication paths between a requesting board 510, a home board 520, and slave board 530 in servicing memory access requests is illustrated, in accordance with one or more embodiments of the present invention. The boards 510, 520, 530, in one embodiment, may include one or more boards (e.g., expander board 40, system board 30, I/O board 35) of one or more control board sets 29(1-n). The term "memory access requests," as utilized herein may include, in one embodiment, one or more of the processors 360(1–4) (see FIG. 3) of a given system board set 29(1-n) accessing one or more caches 362(1–4) or memories 361(1–4) in the system 10.

Although not so limited, for the purposes of this discussion, it is herein assumed that one domain is configured in the system 10 that is formed of one or more complete (i.e., no split expanders) system board sets 29(1-n). Generally, a given cache line in the system 10 is associated with one home board 520. The requesting board 510 in the illustrated embodiment represents a board attempting to access a selected cache line. The slave board 530 in the illustrated embodiment represents a board that currently has a copy of a cache line that the requesting board 510 is attempting to access. In a case where a current copy of a requested cache line resides in the home board 520, then the home board 520 is also the slave board 530 for that transaction.

The requesting board 510 may initiate one of a variety of memory access transactions, including request to own (RTO), request to share (RTS), WriteStream, WriteBack, and ReadStream transactions. The one or more of the aforementioned memory access transactions may be local or remote transactions, where local transactions may include transactions that are broadcast locally within the system board set 29(1-n) and remote transactions may include transactions that are directed to access cache lines from other system board sets 29(1-n). Although not so limited, in one embodiment, an RTO request may be issued to obtain an exclusive copy of a cache line, an RTS request to obtain a shared copy of a cache line, a WriteBack transaction to write the cached line back to the home board, a ReadStream request to get a snapshot copy of the cache line, and a WriteStream request to write a copy of the cache line.

For illustrative purposes, an exemplary RTO transaction among the boards 510, 520, and 530 is described below. For the purpose of this illustration, it is herein assumed that the requesting board 510 is attempting to obtain write-access to a cache line owned by the home board 520, where the latest copy of the requested cache line resides on the slave board 530. The RTO request from the requesting board 510 is forwarded to the home board 520 via path 540. The forwarding of the RTO transaction from the requesting board 510 to the home board 520 is typically handled by the coherency module 382 (see FIG. 3) of the requesting board 510 utilizing the address provided with the RTO request.

The requesting board 510 determines which of the home boards 520 has the requested cache line by, for example, mapping the address of the cache line to the address ranges of the caches associated with the various expander boards 40 within the system 10. When the home board 520 receives the RTO message over the path 540, the coherency module 382 of the home board 520 checks its directory cache 396 (see FIG. 3) to determine if there is an entry corresponding to the requested cache line. Assuming that an entry exists in the directory cache 396, the home board 520 may reference the information stored in that entry to determine that the slave board 530 currently has an exclusive copy of the requested cache line. It should be noted, in one embodiment, that while the directory cache 396 of the home board 520 is being referenced, the coherency module 382 may use the locking module 398 to at least temporarily prevent other expander boards 40 from accessing that entry in the directory cache 396.

Based on the information stored in the directory cache 396, the home board 520 is able to ascertain, in one embodiment, that the slave board 530 currently has an exclusive copy of the cache line. Accordingly, the home board 520, in one embodiment, transmits a request over a path 545 to the slave board 530 to forward a copy of the requested cache line to the requesting board 510. In one embodiment, the slave board 530 downgrades its copy from an exclusive copy (i.e., M-type) to an invalid copy (i.e., I-type) since, by definition, if one board in the system 10 has an exclusive M-copy (i.e., the requesting board 510 in this case), all other nodes should have invalid I-copies.

When the requesting board 510 receives a copy of the cache line over a path 550, it internally notes that it now has an exclusive M-copy and acknowledges over a path 555. When the home board 520 receives the acknowledgment message from the requesting board 510 over the path 555, the home board 520 updates its directory cache 396 to reflect that the requesting board 510 now has the write-access to the cache line, and may use the locking module 398 to allow other transactions involving the cache line to be serviced. The paths 540, 545, 550, and 555, in one embodiment, may be paths through the switch 20 (see FIGS. 1 and 3).

As other transactions occur for accessing cache lines in the home board 520, for example, the coherency module 382 of the home node 520 routinely may update its directory cache 396 to reflect the status of the referenced cache lines. The status of the referenced cache lines may include information regarding the state of the cache line (e.g., M, I, S), ownership rights, and the like. At any given time, because of the finite size of the directory cache 396, it may be possible that a particular set 410 within the directory cache 396 may be full. When a particular set 410 within the directory cache 396 is full, it may be desirable to discard or overwrite old entries to store new entries. Because it may be desirable to retain some entries in the directory cache 396 over others, a method, in accordance with one embodiment of the present invention, for identifying entries that may be more desirable to retain than others is illustrated in FIG. 6.

Figure 6:
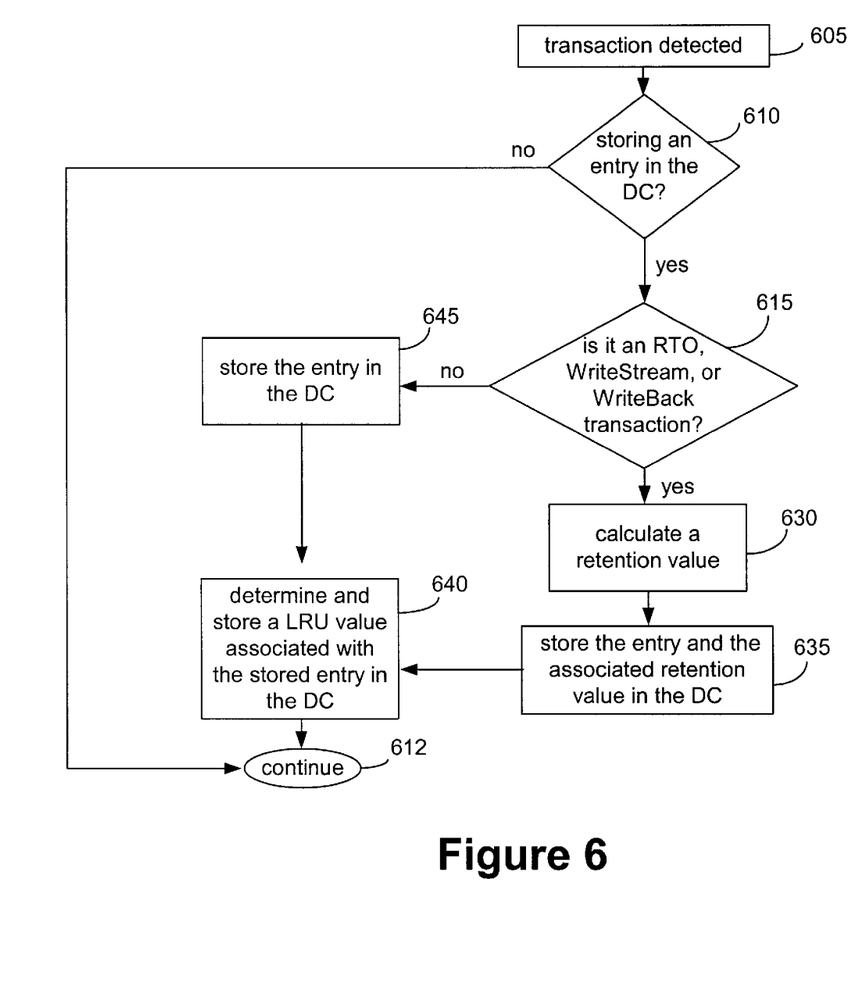
FIG. 6 illustrates a flow diagram of a method for identifying one or more directory cache entries that may be useful to retain in a directory cache of the system of FIG. 1, in accordance with one embodiment of the present invention.

In the method of FIG. 6, the coherency module 382, in one embodiment, detects (at 605) a memory access transaction. As mentioned above, the memory access transaction may include, but is not limited to, RTO, RTS, WriteStream, WriteBack, and ReadStream. The coherency module 382, in one embodiment, determines (at 610) if an entry is to be stored (or updated) in the directory cache 396. An entry may be stored in the directory cache 396, for example, in response to a receipt of a memory access transaction (e.g., RTO, RTS) that may have been initiated by the requesting board 510 (see FIG. 5). However, in one embodiment, not all of the memory access transactions may cause an entry to be created in the directory cache 396. If it is determined (at 610) that no entry is to be stored in the directory cache 396, then the method of FIG. 6 continues (at 612) with its normal operation.

Figure 7:
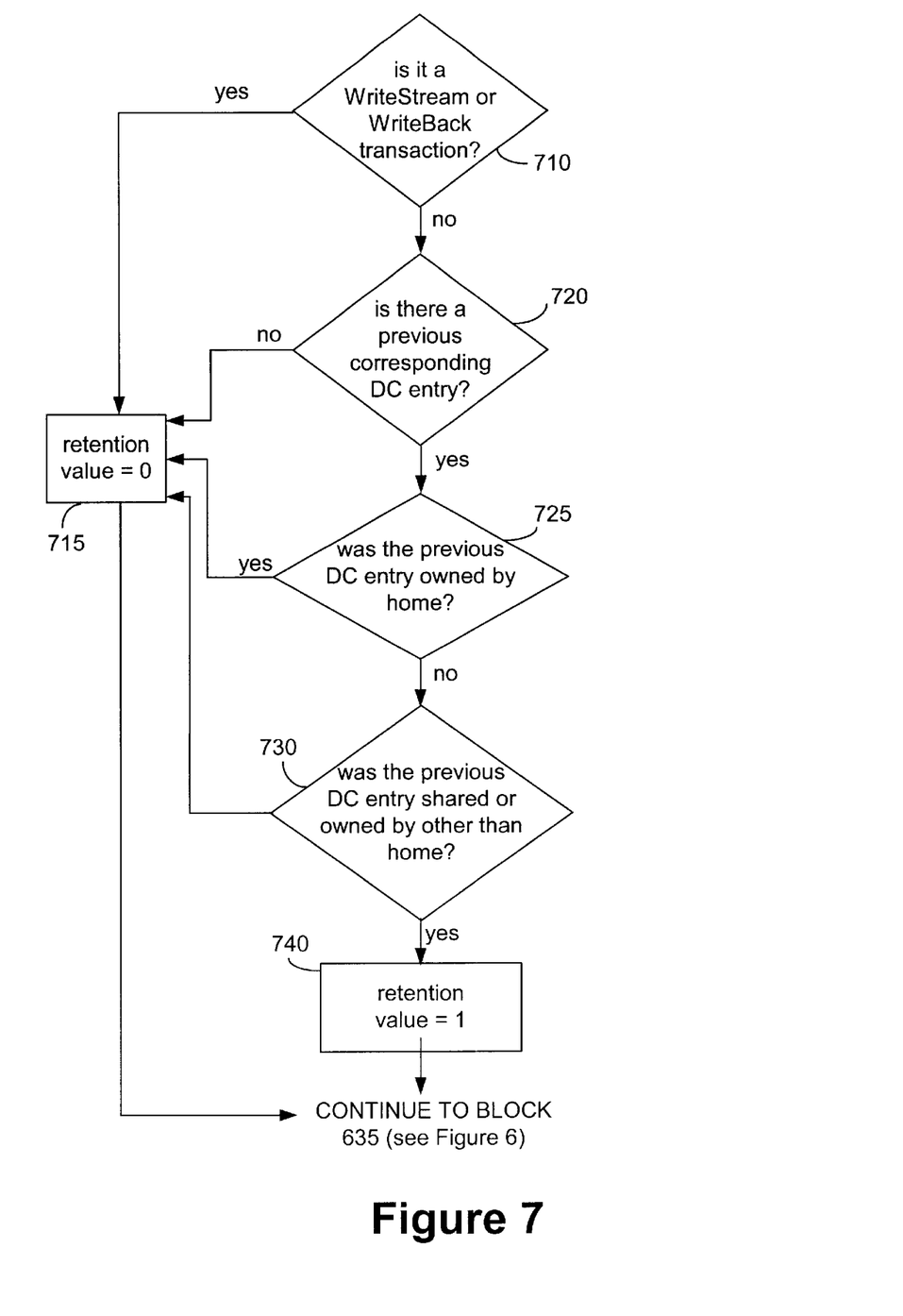
FIG. 7 depicts a flow diagram of a method for determining a retention value associated with one or more entries that are stored in a directory cache of the system of FIG. 1, in accordance with one embodiment of the present invention.
Figure 8:
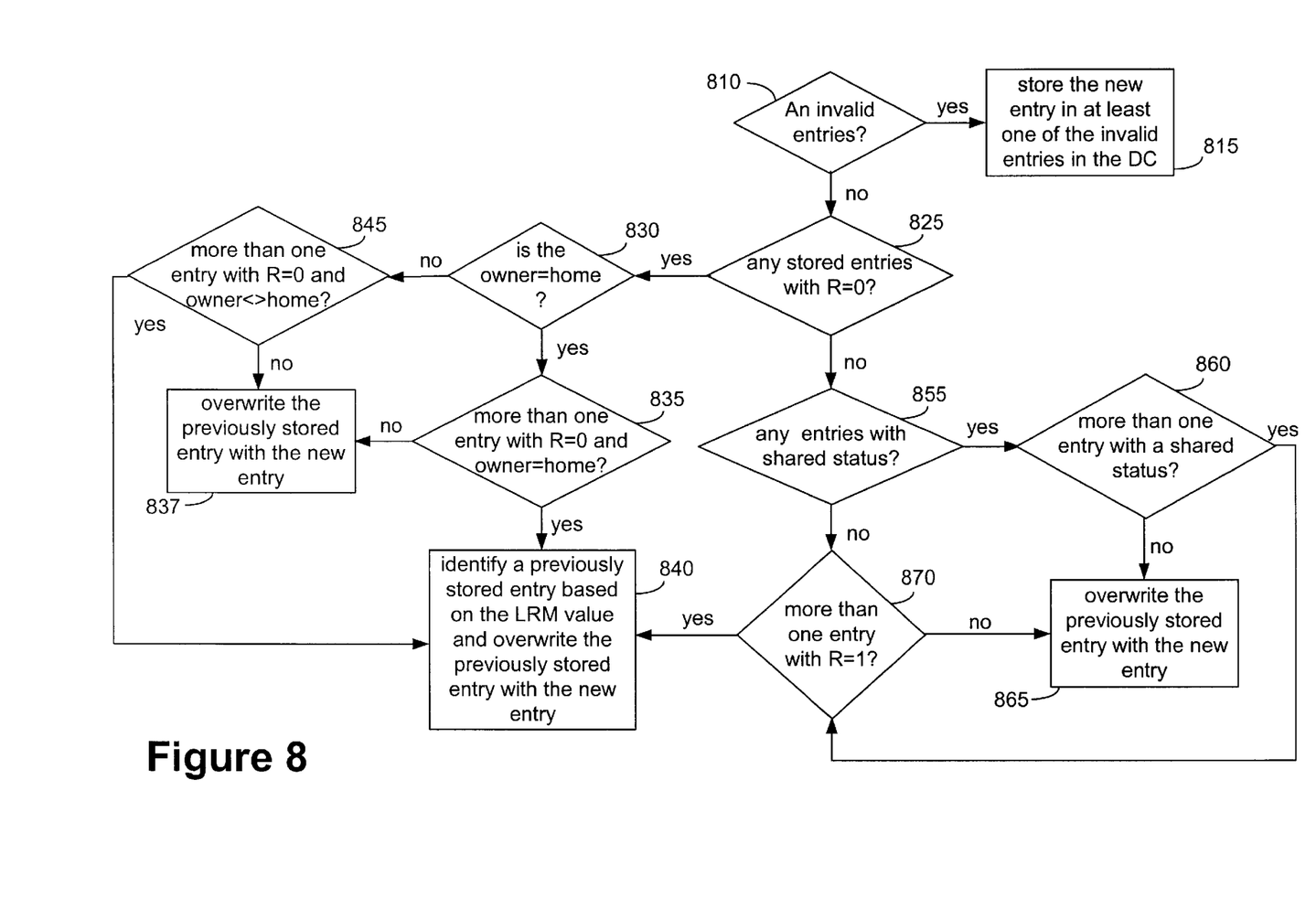
FIG. 8 illustrates a flow diagram of a method of victimizing one or more entries in the directory cache of the system of FIG. 1, in accordance with one embodiment of the present invention.

If, however, it is determined (at 610) that it is desirable to store an entry in the directory cache 396, then the coherency module 382 determines (at 615) if the transaction detected (at 605) is an RTO, WriteStream, or WriteBack transaction. If the transaction is one of the three aforementioned transactions, then, in one embodiment, the coherency module 382 calculates (at 630) a retention value for the entry that is to be stored in the directory cache 396. The retention value, in one embodiment, is indicative of whether it is desirable to victimize one entry over another when the corresponding set 410 in the directory cache 396 is full, for example. One way of calculating the retention value is shown in FIG. 7, which is described in more detail below. As explained earlier, the retention value of the entry stored in the directory cache 396 may, for example, be saved in the retention bit field 475 (see FIG. 4).

The coherency module 382, in one embodiment, stores (at 635) the entry and its associated retention value in the directory cache 396. In one embodiment, a LRU value that is associated with the entry stored (at 635) in the directory cache 396 is determined and stored (at 640). Subsequently, in one embodiment, the method of FIG. 6 continues (at 612) with normal operation.

If it is determined (at 615) that the memory access transaction is not at least one of an RTO, WriteStream, and WriteBack transaction, then the coherency module 382, in one embodiment, stores (at 645) the entry in the directory cache 396. Thus, although not so limited, in the illustrated embodiment, a retention value is not calculated for an RTS transaction, for example. The coherency module 382, in one embodiment, determines and stores (at 640) an LRU value for the entry stored (at 645) and stores it in the directory cache 396. Subsequently, in one embodiment, the method of FIG. 6 continues (at 612) with normal operation.

Referring now to FIG. 7, one embodiment of a method of calculating the retention value of the block 630 of FIG. 6 is illustrated, in accordance with the present invention. The coherency module 382, in one embodiment, determines (at 710) whether the detected memory access transaction (at 605—see FIG. 6) is either a WriteStream or WriteBack transaction (i.e., as opposed to an RTO transaction). If the detected transaction is either a WriteStream or WriteBack, then the coherency module 382 sets the retention value to zero.

Although not so limited, in the illustrated embodiment, a DC entry having a retention value of zero is more likely to be victimized than a DC entry having a retention value of one. A DC entry associated with a WriteStream or WriteBack transaction, in the illustrated embodiment, is assigned a retention value of zero because such entries may be more expendable relative to the other types of entries, as more fully explained below. Once the retention value has been calculated, the method of FIG. 7 continues to the step 635 of FIG. 6, in one embodiment.

The coherency module 382, in one embodiment, determines (at 720) if the entry desired to be stored (at 610—see FIG. 6) has a previously corresponding entry already stored in the directory cache 396. If the directory cache 396 does not contain a previous corresponding entry, then, in one embodiment, the coherency module 396 sets (at 715) the retention value to zero. In this instance, since the entry that is desired to be stored (at 610—see FIG. 6) is a new entry, it may be assigned a low retention priority relative to other entries because the new entry may be more expendable as it may be less likely to be referenced again once it is overwritten by another entry in the directory cache 396.

If it is determined (at 720) that a previous corresponding entry exists, then, in one embodiment, the coherency module 382 determines (at 725) if the previously stored entry was owned by the home board 520. If the previously stored entry is owned by the home board 520, then the coherency module 382, in one embodiment, sets (at 715) the retention value to zero.

If it is determined (at 720) that a previous corresponding entry exists, then, in one embodiment, the coherency module 382 determines (at 730) if the previously stored entry was shared or owned by a board other than the home board 520. If yes, then the coherency module 382, in one embodiment, sets (at 740) the retention value to one. Although not so limited, in the illustrated embodiment a previously stored entry that has a shared status (or "owned by another board" status) is assigned a high retention value (i.e., one) because the cache line associated with such an entry may be more likely to be accessed again in the near future. If the previously stored entry was not shared or owned by a board other than the home board 520, then, in one embodiment, the retention bit value is set (at 715) to zero and the method of FIG. 7 thereafter may continue to the block 635 of FIG. 6.

It should be appreciated that the method of FIG. 7 provides one example of calculating retention values, although, in other embodiments, a different scheme may be employed, depending on the implementation. Furthermore, in alternative embodiments, the priority given to selected memory access transactions may also vary from the described embodiment.

Figure 9A:
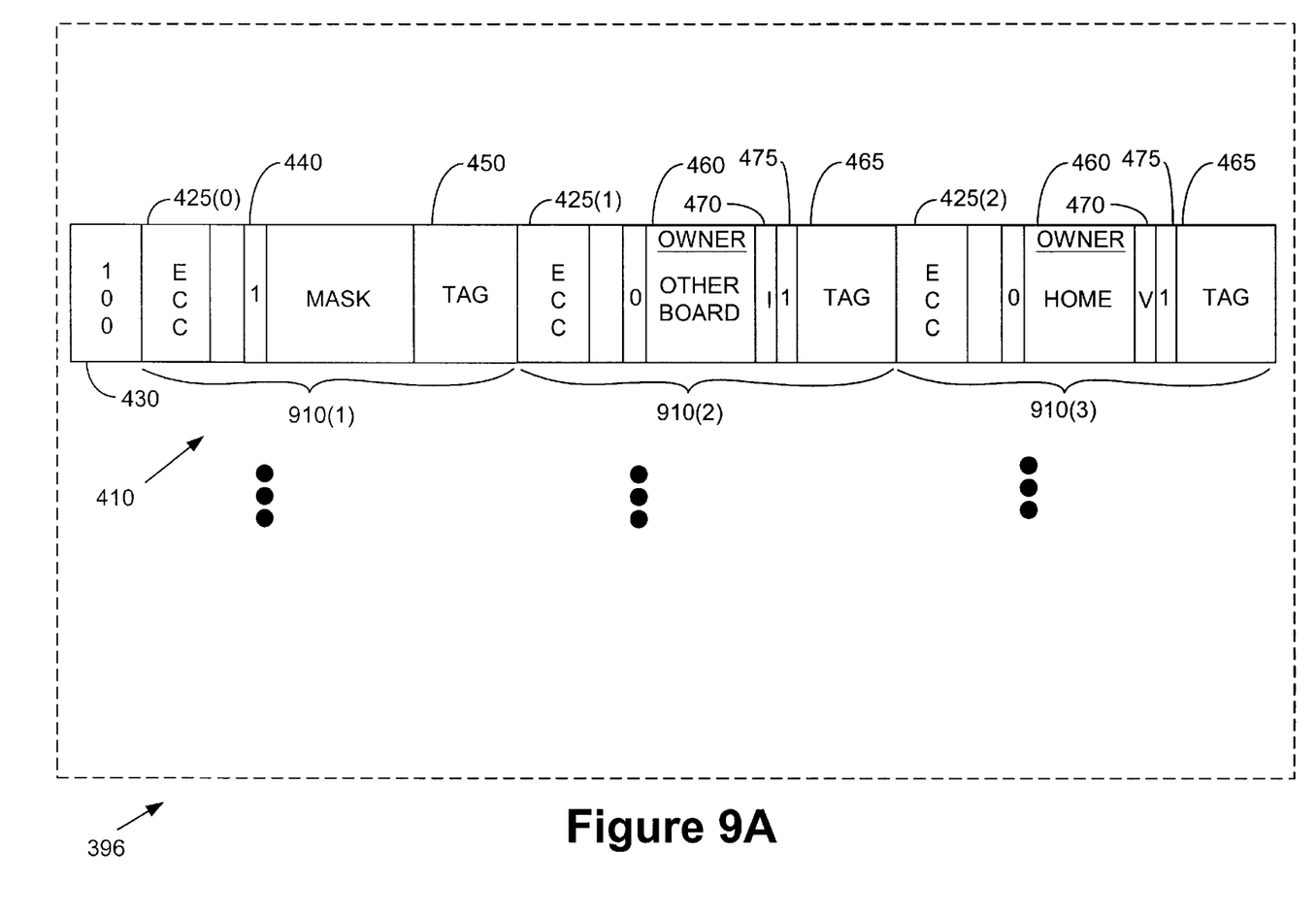
FIGS. 9A–C depict a stylized embodiment of a directory cache of the system of FIG. 1 containing exemplary entries, in accordance with the present invention.
Figure 9B:
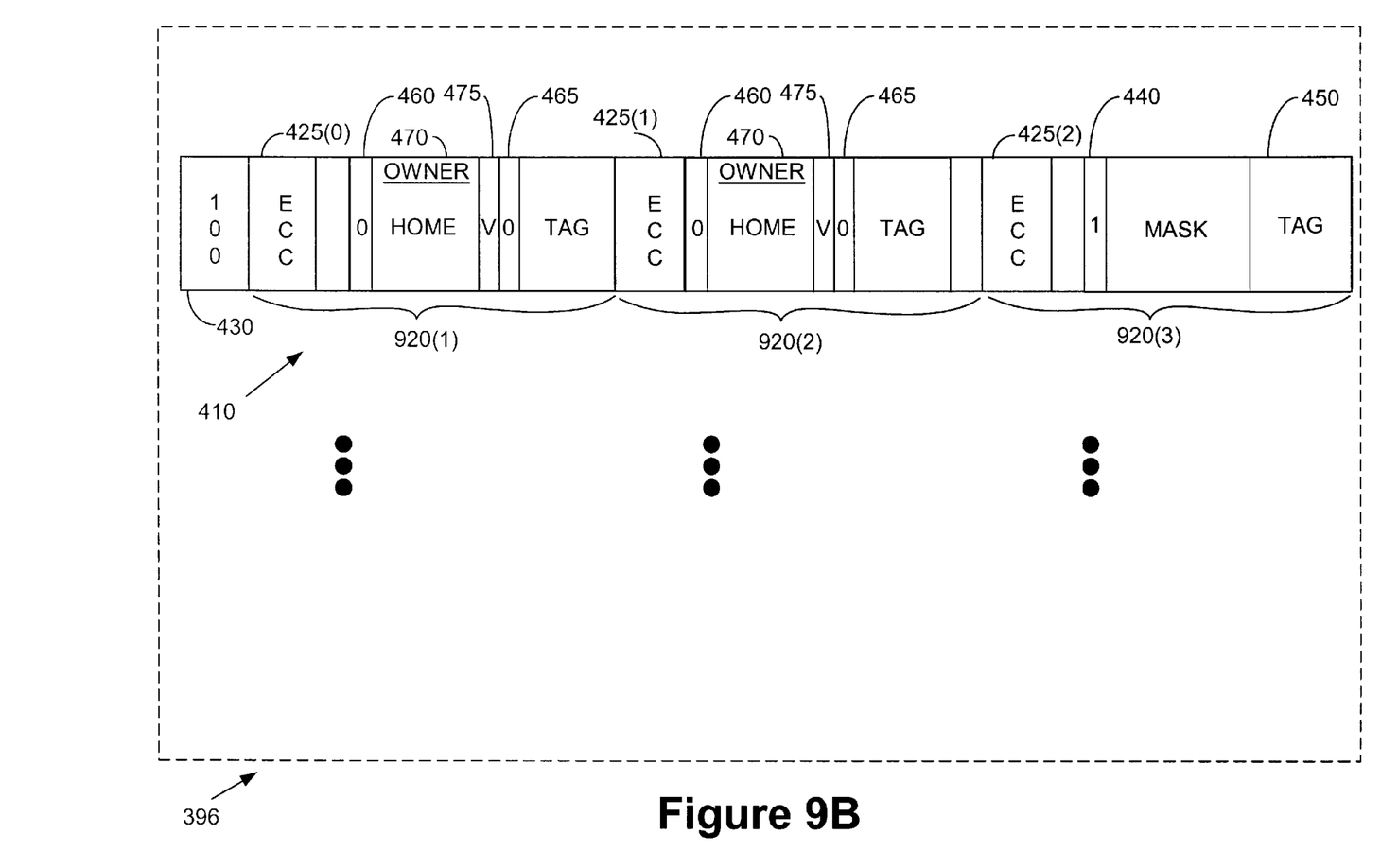
Figure 9C:
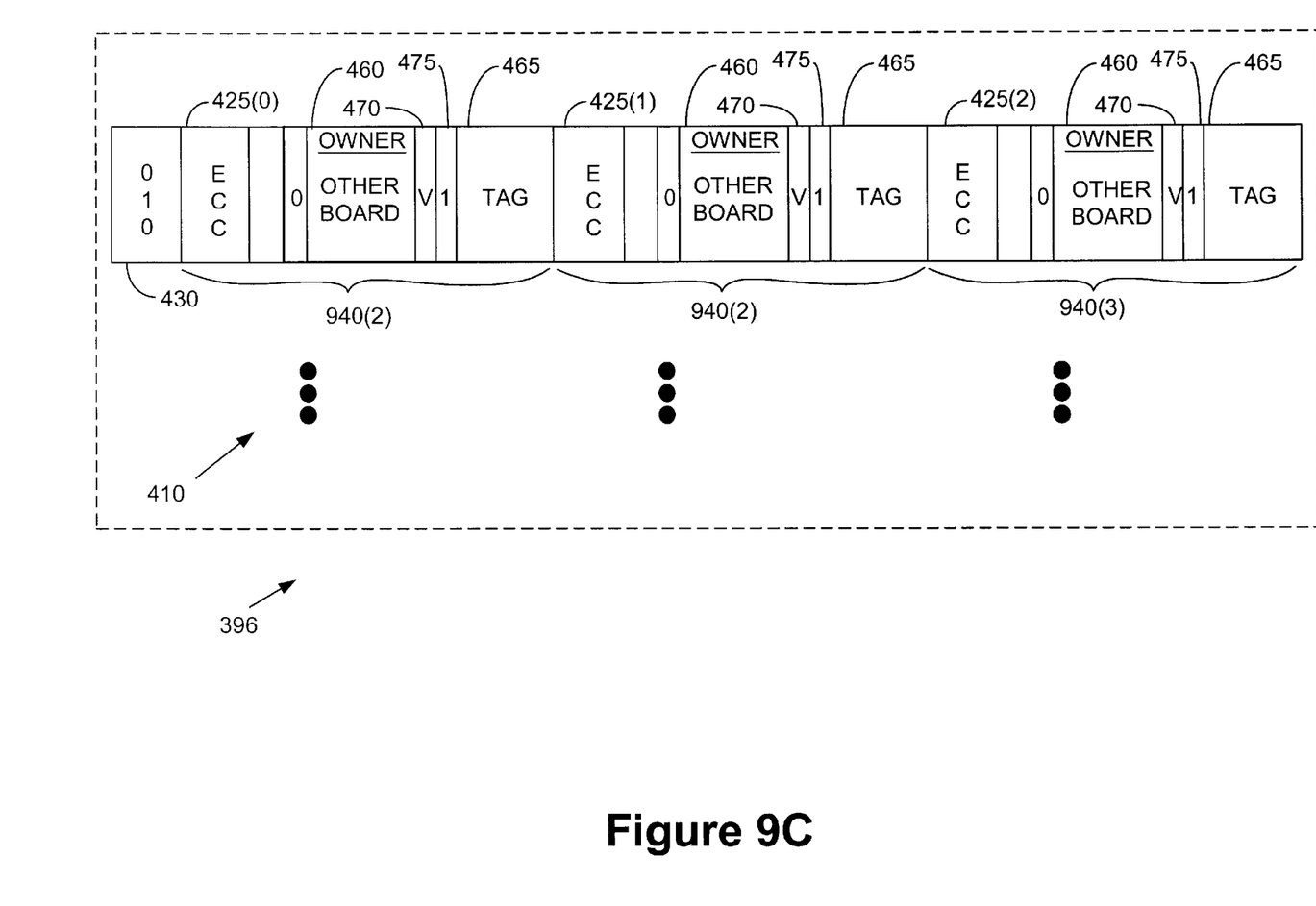

Referring now to FIGS. 8 and 9A–C, one embodiment of a method of victimizing one or more entries in a particular set 410 of the directory cache 396 is illustrated. FIGS. 9A–C illustrate a stylized embodiment of the directory cache 396 having a plurality of exemplary entries 910(1–3), 920(1–3) and 940(1–3) stored within the set 410. In the description below, reference to one or more of the FIGS. 9A–C are made whenever helpful in the understanding of the illustrated embodiment of the method of FIG. 8. For ease of illustration, a few assumptions are made: in particular, it is herein assumed that the relevant set 410 of the directory cache 396 of FIGS. 9A–C is full, the directory cache 396 is associated with the home board 520 (see FIG. 2), and the home board 520 has received a transaction for which it is desirable to store a new entry in the filled set 410 of the directory cache 396.

In accordance with one embodiment of the present invention, and as is described in more detail below, a stored entry in the set 410 of the directory cache 396 may be victimized in the following order: (1) an invalid entry in the set 410 of the directory cache 396; (2) an entry with a retention value of zero that is owned by the home board 520; (3) an entry with a retention value of zero that has an owner other than the home board 520 or is a shared entry; (4) an entry with a retention value of one. If more than one entry falls within one of the above-described categories, then, in one embodiment, the LRM value in the LRM field 430 (see FIG. 4) may be used to select at least one entry to victimize. It should be appreciated that the above presented victimization order is exemplary in nature, and that, in other embodiments, the order may vary, depending on the implementation.

In one embodiment, when accessing an entry in the directory cache 396, the coherency module 382 may read the set 410 to which the entry belongs. Alternatively, in another embodiment, the coherency module 382 may access the directory cache 396 on an entry-by-entry basis. The manner in which the directory cache 396 is accessed may be implementation specific.

Referring again to FIG. 8, the coherency module 382 of the home board 520, in one embodiment, determines (at 810) if the set 410 of the directory cache 396 contains one or more entries 910(1-m) that are invalid. As mentioned earlier, in the illustrated embodiment, there may be two types of entries stored in the directory cache 396: shared entries 910(1) or owned entries 910(2-3). In one embodiment, the valid field 470 (see FIG. 4) of the owned entries 437 (see FIG. 4) may indicate which of the entries in the directory cache 396 are invalid. The directory cache 396, after a reset or re-initialization, may initially contain invalidated entries, for example. If the coherency module 382 of the home board 520 determines (at 810) that one or more invalid entries are present in the directory cache 396, then the new entry may be stored (at 815) in a slot occupied by one or more of the invalid entries.

For example, in FIG. 9A, entry 910(2) of the directory cache 396 is an invalid entry, as symbolically indicated by the letter "I" in the valid field 470. As such, in one embodiment, the invalid entry 920(3) may be overwritten by the new entry. In the exemplary directory cache 396 of the FIG. 9A, the other owned entry 910(3) is a valid entry, as symbolically represented by the letter "V" in the valid field 470 of the entry 910(3).

If there are no invalid entries in the set 410 of the directory cache 396, as is the case in the exemplary directory cache 396 of FIG. 9B, then the coherency module 382, in one embodiment, determines (at 825) if any of the entries stored in the directory cache 396 have a retention value of zero. For example, in the directory cache 396 of FIG. 9B, the entries 920(1-2) have a retention value of zero, as indicated by the "0" stored in the retention field 465. As explained above, in the illustrated embodiment, entries having a retention value of zero may be more expendable as compared to those with a retention value in a given set 410.

If there are one or more entries with a retention value of zero, then the coherency module 382, in one embodiment, determines (at 830) if the owner of such an entry (or entries) is the home board 520. If the owner is the home board 520, then the coherency module 582 may determine (at 835) whether there is more than one entry with a retention value of zero for which the owner is the home board 520. In FIG. 9B, among the entries 920(1-2) with a retention value of zero, both of the entries 920(1-2) have the home board 520 as the owner.

If the coherency module 382 determines (at 835) that there are more than one entries with a retention value of zero for which the owner is the home board 520, as is the case in the directory cache 396 of FIG. 9B, then the coherency module 382, in one embodiment, identifies (at 840) one of those entries based on the LRM value associated with the entries and overwrites that entry with the new entry. For example, in FIG. 9B, entries 920(1-2) each has a retention value of zero and the home board 520 as the owner. To determine which of the two entries 920(1-2) to replace with the new entry, the LRM bits ("100") in the LRM field 430 are used to determine which of the two entries 920(1-2) was least recently modified. As shown in Table 2 above, the sequence of LRM bits "100" indicates, in the illustrated embodiment, that the most recently modified field is 920(1), and the least recently modified field is 920(2). As such, the field 920(2) in the illustrated example of FIG. 9B would be victimized to make room for the new entry.

If (at 835) there is not more than one entry (i.e., there is only one entry with R=0 and Home=Home Board), then the coherency module 382, in one embodiment, replaces (at 837) that one entry that has a retention value of zero and has the home board 520 as the owner with the new entry.

If it is determined (at 830) that the owner of the entry (or entries) having a retention value of zero is not the home board 520, then, in one embodiment, the coherency module 382 determines (at 845) if there are one or more entries with retention value of zero for which the owner is not the home board 520 (i.e., some board other than the home board 520 is the owner of that entry). If it is determined (at 845) there is only entry with the retention value equal to zero and that has an owner that is not the home board 520, then that entry is overwritten (at 837) by the new entry.

If the coherency module 382 determines (at 845) that there are more than one entries with a retention value of zero for which the owner is not the home board 520, then the coherency module 382, in one embodiment, identifies (at 840) one of those entries based on the LRM value associated with the entries and overwrites that entry with the new entry.

The coherency module 382, in one embodiment, determines (at 855) whether any of the stored entries in the directory cache 396 have a shared status (i.e., as opposed to an "owned" status). For example, with reference to FIG. 9B, the entry 920(3) is a shared entry, as indicated by a "1" in the identifier field 440. The "shared status," as mentioned earlier, indicates that the entry is being shared by one or more boards 40 in the board sets 29(1-n) in the system 10. If it is determined (at 855) that there is at least one entry with the shared status, then the coherency module 382, in one embodiment, determines (at 860) if the directory cache 396 includes more than one shared entry. If only one shared entry exists, then the coherency module 382 overwrites (at 865) that shared entry with the new entry. In the illustrated example of FIG. 9B, there is only one shared entry 920(1). As such, in the illustrated example, the shared entry 920(3) may be overwritten by the new entry. If, however, more than one shared entry exists in the directory cache 396, then the coherency module 382, in one embodiment, identifies (at 840) one entry out of those entries based on an associated LRM value and then overwrites the identified entry with the new entry.

The coherency module 382, in one embodiment, determines (at 870) if more than one entry exists with a retention value of one. If there is not more than one entry in the directory cache with a retention value of one (i.e., there is only one such entry), then the coherency module 382 may overwrite (at 865) that entry with the new entry. If, however, it is determined (at 870) that there is more than one entry with the retention value equal to one, then, the coherency module 382, in one embodiment, identifies (at 840) one entry out of those entries based on the LRM value associated with the stored entries and overwrites the identified entry with the new entry.

For example, as shown in FIG. 9C, the entries 940(1-3) have a retention value of one, as indicated by numeral "1" stored in the retention bit field 475 of each entry 940(1-3). Since there is more than one entry with a retention value of one, in the illustrated example, the LRM bits ("010") in the LRM field 430 are utilized to select one of the three entries 940(1-3) to victimize. In the illustrated embodiment, LRM bits "010" indicate that entry 940(2) is the least recently modified (see Table 2), and, as such, entry 940(2) is overwritten by the new entry.

The various system layers, routines, or modules may be executable control units (such as control unit 389 (see FIG. 3). Each control unit may include a microprocessor, a microcontroller, a digital signal processor, a processor card (including one or more microprocessors or controllers), or other control or computing devices.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
   performing memory coherence operations within a first system board set using a first coherence scheme; and
   performing memory coherence operations between the first system board set and a second system board set using a second coherence scheme, wherein the second coherence scheme employs a retention value associated with one or more entries stored in a directory cache to identify which entry to victimize when storing a new entry.

2. The method of claim 1, wherein the first coherence scheme comprises a Modified, Exclusive, Shared, Invalid (MESI) cache coherency protocol.

3. The method of claim 1, wherein the second coherence scheme comprises a scalable shared memory (SSM) protocol.

4. The method of claim 3, wherein the SSM protocol comprises:
   detecting a memory access transaction;
   determining the retention value based on the type of memory access transaction; and
   storing the retention value in an entry associated with the memory access transaction.

5. The method of claim 1, wherein the second coherence scheme identifies which entry to victimize when storing a new entry using a least recently modified value when one or more of the entries have the same retention value.

6. The method of claim 1, wherein the second coherence scheme stores the retention value associated with the one or more entries in the directory cache.

7. A system comprising:
   a first system board set, wherein memory coherence operations within the first system board set are performed using a first coherence scheme;
   a second system board set coupled to the first system board set, wherein memory coherence operations between the first system board set and a second system board set using a second coherence scheme, wherein the second coherence scheme employs a retention value associated with one or more entries stored in a directory cache to identify which entry to victimize when storing a new entry.

8. The system of claim 7 further comprising
   a directory cache comprising a plurality of entries, and
   a control unit operable to:
   detect a memory access transaction;
   determine a retention value based on the type of memory access transaction; and
   store the retention value in an entry in the directory cache associated with the memory access transaction.

9. The system of claim 8, wherein each entry in the directory cache has an associated least recently modified value.

10. A computer-readable storage medium containing a plurality of program instructions, wherein said program instructions define a method comprising:
    performing memory coherence operations within a first system board set using a first coherence scheme; and
    performing memory coherence operations between the first system board set and a second system board set using a second coherence scheme, wherein the second coherence scheme employs a retention value associated with one or more entries stored in a directory cache to identify which entry to victimize when storing a new entry.

11. The storage medium of claim 10, wherein the first coherence scheme comprises a Modified, Exclusive, Shared, Invalid (MESI) cache coherency protocol.

12. The storage medium of claim 10, wherein the second coherence scheme comprises a scalable shared memory (SSM) protocol.

13. The storage medium of claim 12, wherein the SSM protocol comprises:
    detecting a memory access transaction;
    determining the retention value based on the type of memory access transaction; and
    storing the retention value in an entry associated with the memory access transaction.

14. The storage medium of claim 10, wherein the second coherence scheme identifies which entry to victimize when storing a new entry using a least recently modified value when one or more of the entries have the same retention value.

15. The storage medium of claim 10, wherein the second coherence scheme stores the retention value associated with the one or more entries in the directory cache.

* * * * *